March 7, 1944.  L. A. BEARD  2,343,251
NONSKID TWO-PIECE METAL JACKET
Filed Oct. 21, 1942
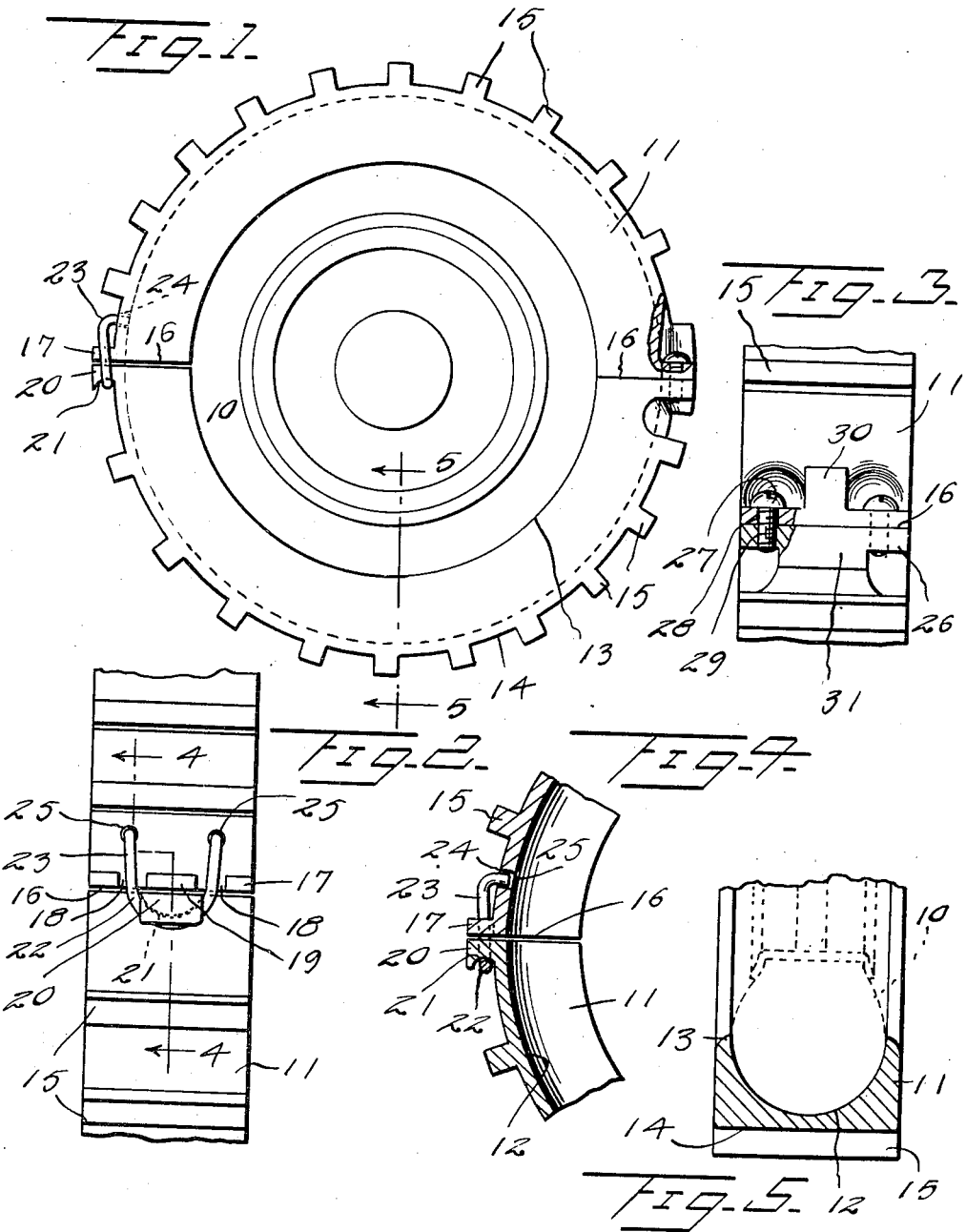
Inventor
L.A. Beard
By L.F. Randolph
Attorney Patented Mar. 7, 1944

2,343,251

UNITED STATES PATENT OFFICE 2,343,251

NONSKID TWO-PIECE METAL JACKET

Louis Aaron Beard, Silsbee, Tex.

Application October 21, 1942, Serial No. 462,861

1 Claim. (Cl. 152—57)

This invention relates to a jacket for use on wheels of automobiles and trucks to protect the tires thereof, especially those of the pneumatic type, against puncture, when the automobile or truck is used in wooded sections or in muddy or soft slick ground when heavy loads are being hauled.

An object is to provide such a device of metallic form secured together in sections in a novel manner with the securing means quite substantial so as not to be affected by an uneven surface, especially from contact with exposed stumps and roots, enabling the vehicle to travel thereover and thus greatly minimizing the danger of jamming of the transmission as well as a saving in the use of fuel.

The more specific objects and advantages become apparent from a consideration of the description following taken in connection with accompanying drawing illustrating an operative embodiment.

In said drawing:

Figure 1 is a view in side elevation of the jacket constructed in accordance with my invention, the same being partly broken away to disclose details;

Figure 2 is a fragmentary edge view of the jacket looking from the left of Figure 1;

Figure 3 is a fragmentary edge view of the jacket looking from the right in Figure 1 and partly broken away to disclose details;

Figure 4 is a detail section taken on the plane of line 4—4 of Figure 2; and

Figure 5 is a detail diametric section taken on the plane of line 5—5 of Figure 1.

Referring specifically to the drawing wherein like reference characters designate like or similar parts, a pneumatic tire is shown at 10 which is representative or conventional of that type used on automobiles and trucks, especially where they travel in wooded sections and are exposed to stumps, roots, spinning, muddy or soft slick ground or the like.

Completely surrounding the pneumatic tire 10, is a jacket 11 of a suitable metal and preferably of steel. This jacket has an inner arcuate surface at 12 which is intimately fitted by the outer surface of the tire, the latter being but partly exposed at the sides and at the adjacent edges being rounded or beveled as at 13 to shed foreign matter to the exterior of the casing.

The tread surface of the jacket may be of any desired shape, the same generally being flat as at 14 and equipped with a multiplicity of transverse cleats or bars 15, preferably integral therewith.

The jacket preferably is made in two sections which are separable on a line diametrically of the tire as at 16.

Adjacent the line of separation, the one section has a transverse cleat 17, which functions like those 15, made up of a plurality of parts having openings 18 therebetween. In contact with the central of such parts 19, is a lug 20 of materially less width than the jacket, which lug at its free side is undercut as at 21 and curved or arcuate as best seen in Figure 2. Such undercut or curve is fitted by correspondingly shaped portion 22 of a resilient U-shaped latch 23, which terminally has angular lugs 24 removably engaging openings or sockets 25 provided in one of the jacket sections. It will be noted that the clip or latch 23 is accommodated in the openings or spaces 18 and that it is so disposed as not to be likely to be displaced or injured by contact with stumps, roots, or the like.

At the other joint between the two sections of the jacket, transverse cleats 26 are in contact, such cleats functioning like those at 15. Cleats 26 may be joined in any suitable manner as by screw elements such as 27 which pass loosely through openings 28 in one of the cleats and are screw-threaded in openings 29 of the other cleat. In lieu of the screws 27, it is clear that I may use bolts provided with nuts, the bolts passing through openings in both cleats with the head engaging one of them and the nut engaging the other. Each cleat 26 has a central extension as at 30 and 31, to afford the necessary strength and also to prevent foreign elements or matter reaching and interfering with the fastening means.

Attention is called to the fact that the sections of the jacket are secured to the tire 10 sufficiently tight to prevent spinning of the casing and burning of rubber and so that the casing and tire cannot slide relatively or turn relatively to each other.

The lugs 20 may be welded or otherwise permanently secured to the head of jacket 11, when desired.

It also is clear that the jacket may be manufactured in various sizes and weights to fit all sizes of automobile and truck tires.

I claim as my invention:

A protective metallic jacket or resilient tire, the jacket comprising two sections having an arcuate interior fitting the exterior peripheral surface of the tire, said jacket being in two sections, contacting cleats at one joint of the sections, screw means joining said cleats, projections of the cleats extending in opposite directions peripherally of the tire between the fastening means, a cleat on one of the sections at the other joint having openings therethrough, a cleat on the opposed section contacting the latter cleat and of less width than the width of the jacket, the last mentioned cleat being undercut, and a U-shaped latch on one of the sections passing through the openings and engaging the undercut of the last mentioned cleat.

LOUIS AARON BEARD.